United States Patent
Walker et al.

(10) Patent No.: US 9,366,384 B1
(45) Date of Patent: Jun. 14, 2016

(54) OIL LUBRICATING PROCESS FOR ACTUATOR PIVOT BEARINGS

(71) Applicant: Western Digital Technologies, Inc., Irvine, CA (US)

(72) Inventors: Shane Walker, Longmont, CO (US); Robert C. Winter, Longmont, CO (US)

(73) Assignee: Western Digital Technologies, Inc., Irvine, CA (US)

( * ) Notice: Subject to any disclaimer, the term of this patent is extended or adjusted under 35 U.S.C. 154(b) by 294 days.

(21) Appl. No.: 14/018,000

(22) Filed: Sep. 4, 2013

Related U.S. Application Data

(60) Provisional application No. 61/857,476, filed on Jul. 23, 2013.

(51) Int. Cl.
  *F16N 25/00* (2006.01)
(52) U.S. Cl.
  CPC ..................... *F16N 25/00* (2013.01)
(58) Field of Classification Search
  CPC ....................................................... F16N 25/00
  USPC .......................................... 184/7.4; 508/552
  See application file for complete search history.

(56) References Cited

U.S. PATENT DOCUMENTS

| | | | | |
|---|---|---|---|---|
| 3,920,571 | A * | 11/1975 | Crocker | C10M 123/00 508/179 |
| 5,059,336 | A * | 10/1991 | Naka | C10M 169/00 508/310 |
| 5,373,407 | A * | 12/1994 | Stupak, Jr. | G11B 33/1446 360/99.08 |
| 5,856,281 | A | 1/1999 | Otsuka et al. | |
| 6,531,431 | B2 | 3/2003 | Mohri et al. | |
| 7,067,463 | B2 * | 6/2006 | Akiyama | C10M 169/06 384/206 |
| 2002/0147119 | A1 | 10/2002 | Shimizu et al. | |
| 2003/0047386 | A1 * | 3/2003 | Sherrington | F16N 29/02 184/7.4 |
| 2010/0147627 | A1 * | 6/2010 | Lakomiak | F16C 33/6674 184/7.4 |
| 2012/0277135 | A1 * | 11/2012 | Lacerenza | C10M 131/10 508/463 |

\* cited by examiner

*Primary Examiner* — William E Dondero
*Assistant Examiner* — Robert T Reese

(57) ABSTRACT

A method of lubricating a bearing for an actuator pivot of a storage device, the method including receiving an assembled bearing for an actuator pivot of a storage device, applying a volume of soap-free oil onto a bearing component of the assembled bearing, and dispensing a predetermined volume of soap-containing grease into a bearing cage.

28 Claims, 8 Drawing Sheets

OIL LUBRICATING PROCESS FOR
ACTUATOR PIVOT BEARINGS

CROSS REFERENCE TO RELATED
APPLICATION

This application claims the benefit of U.S. provisional application No. 61/857,476, filed Jul. 23, 2013, the disclosure of which is hereby incorporated by reference.

FIELD

The present disclosure relates generally to data storage devices and in particular, to a method of lubricating bearings of an actuator pivot in a data storage device by applying oil to the raceways prior to exercising the bearing.

BACKGROUND

Information storage devices are used to retrieve and/or store data in computers and other consumer electronics devices. A magnetic hard disk drive is an example of an information storage device that includes one or more heads that can both read and write, but other information storage devices also include heads—sometimes including heads that cannot write. For convenience, all heads that can read are referred to as "read heads" herein, regardless of other devices and functions the read head may also perform (e.g. writing, flying height control, touch down detection, lapping control, etc.).

BRIEF DESCRIPTION OF THE DRAWINGS

A general architecture that implements the various features of the disclosure will now be described with reference to the drawings. The drawings and the associated descriptions are provided to illustrate implementations of the disclosure and not to limit the scope of the disclosure. Throughout the drawings, reference numbers are reused to indicate correspondence between referenced elements.

DETAILED DESCRIPTION

In a modern magnetic hard disk drive device, each read head is a sub-component of a head gimbal assembly (HGA), which is discussed in greater detail below with reference to an example embodiment. The HGA, in turn, is a sub-component of a head stack assembly (HSA) that typically includes a plurality of HGAs, a head actuator, and a flex cable.

The head actuator of the HSA is pivotally attached to a base of the disk drive, for example by an actuator pivot bearing cartridge that allows the HSA to pivot. The relative position of other disk drive components limits such pivoting to a limited angular range. The actuator pivot bearing cartridge typically includes a lubricant such as grease. Currently actuator pivot bearings are assembled dry. Once bearing assembly is completed, grease is added to pockets in the bearing cage. This grease typically includes two components: (1) oil, and (2) an oil "carrier" which is frequently referred to as thickener, urea, or soap. In some implementations, the soap is required to hold the oil in place in the bearing cage until it is needed. The bearing is then spun or rotated to distribute the oil, from the grease, across the balls and the raceways of the bearing. This process pulls oil from the initial grease volume. The oil from the grease inherently includes some of the grease soap.

This process may create several challenges. The first challenge is that of the pivot life of bearings which don't have the physical space to add the desired amount of grease. Specifically, with the development of very thin drives, the bearing profile has been decreased substantially. This directly impacts the capacity of the grease that can be physically included in the acceptable areas of a bearing. As volume of grease in the bearings may be decreased pivot bearing, and consequently, drive life may be impacted.

A second challenge with this process is the possibility of bearing torque disturbances. Disk drive actuator pivot bearings are often used in an oscillating application while, the large majority of all other ball bearing applications are primarily rotational applications. A phenomenon that has been discovered in these oscillating applications, which is not observed in a rotational application, is the development of what is referred to as a "grease bump" (GB). These GBs may result from a concentration of the grease soap in the bearing raceway which builds up over time at the edges of the seek zone of the actuator range.

In view of these changes, implementations of the present application may provide a method for charging or lubricating the bearings of a pivot assembly.

Figure 1:
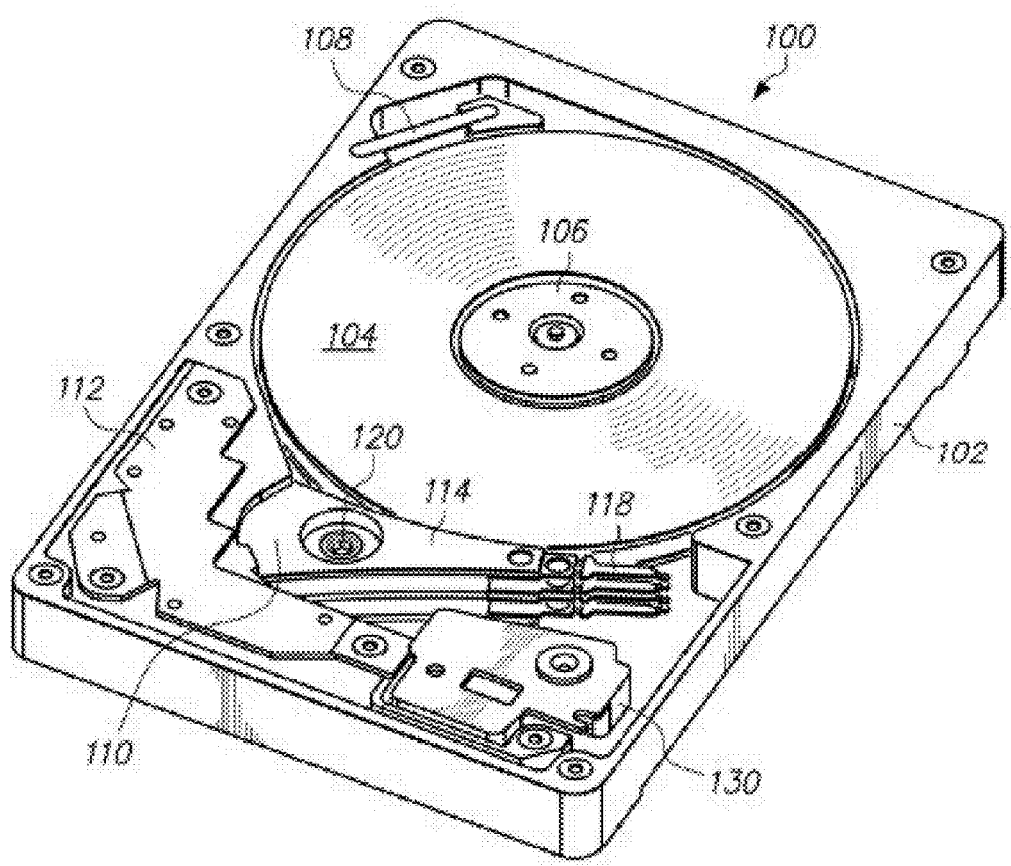
FIG. 1 a top perspective view of a disk drive capable of being assembled using one or more implementations of the present application.

FIG. 1 provides a top perspective view of a disk drive 100 capable of being assembled using one or more implementations of the present application, with the disk drive cover removed to enable viewing of certain internal disk drive components. The disk drive 100 includes a disk drive base 102. The disk drive 100 further includes a spindle 106, rotatably mounted on the disk drive base 102, for rotating at least one disk 104 that is mounted on the spindle 106. In certain embodiments, disk drive 100 may have only a single disk 104, or alternatively, two or more disks. The rotation of the disk(s) 104 establishes air flow through an optional recirculation filter 108. The disk drive 100 may optionally also include an adsorbent filter 130 for helping to remove contaminants from the internal atmosphere within the disk drive, if and after such contaminants have entered the internal atmosphere within the disk drive.

In the embodiment of FIG. 1, the disk drive 100 further includes a head actuator 110 that is pivotably mounted on disk drive base 102 by an actuator pivot bearing 120. The head actuator 110 includes a plurality of actuator arms (e.g. actuator arm 114), each supporting a head gimbal assembly (e.g. HGA 118). For example, the HGA 118 may be attached to a distal end of the actuator arm 114 by the well-known conventional attachment process known as swaging. Preferably the disk drive 100 will include one HGA 118 per disk surface, but depopulated disk drives are also contemplated in which fewer HGAs are used. In FIG. 1, the HGAs 118 is shown demerged from the disk 104, so that the disks do not obscure the HGAs from view. In such position, the HGAs would be supported by a conventional head loading ramp (not shown in FIG. 1 so that the view of the HGAs will not be obstructed).

The distal end of the HGA 118 includes a conventional read head (too small to be seen in the view of FIG. 1) for reading and writing data from and to a magnetic disk (e.g. disk 104). The read head may optionally include a ceramic slider substrate and a read/write transducer that may be an inductive magnetic write transducer merged with a magneto-resistive read transducer (e.g. a tunneling magneto-resistive read transducer). Note: Any head that includes a read transducer is referred to as a "read head" herein, even if the head also includes other structures for performing other functions (e.g. writer, microactuator, heater, lapping guide, etc.). Note also that in certain optical disk drives, it is possible for a read head to include an objective lens rather than a read transducer.

Also in the embodiment of FIG. 1, a magnet 112 may provide a magnetic field for a voice coil motor to pivot the head actuator 110 about the actuator pivot bearing 120 through a limited angular range, so that the read head of HGA 118 may be desirably positioned relative to one or more tracks of information on the disk 104.

Figure 2:
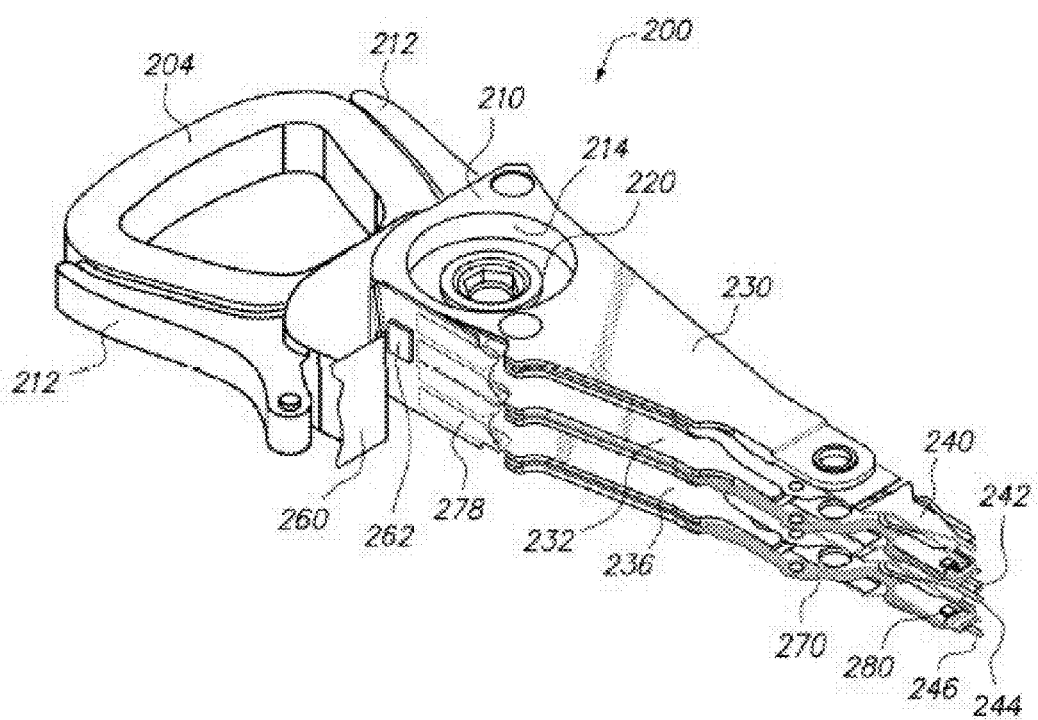
FIG. 2 is a top perspective view of a head actuator capable of being assembled using one or more implementations of the present application.

FIG. 2 is a top perspective view of a head actuator 200 capable of being assembled using one or more implementations of the present application. The head actuator 200 includes an actuator body 210. In the embodiment of FIG. 2, actuator arms 230, 232, 236 extend from the actuator body 210 in a first direction, while a voice coil support 212 and a voice coil 204 extend from the actuator body 210 in a second direction that is approximately opposite the first direction. An electrical current driven through the voice coil 204 may interact with a magnetic field from a permanent magnet within the disk drive (e.g. magnet 112 of FIG. 1), to create a torque to pivot and control the angular position of the head actuator 200.

In the embodiment of FIG. 2, the actuator arms 230, 232, 236 support head gimbal assemblies (HGAs) 240, 242, 244, 246. Specifically, the actuator arm 230 supports the HGA 240, the actuator arm 232 supports the HGAs 242 and 244, and the actuator arm 236 supports the HGA 246. In the embodiment of FIG. 2, each of the HGAs 240, 242, 244, and 246, in turn, supports a read head. For example, the HGA 246 includes a flexure 270 that supports a read head 280 and that includes conductive traces to facilitate electrical connection to the read head 280. A terminal region 278 of the flexure 270 may be electrically connected to a flex cable 260, which runs to an external connector, and upon which a pre-amplifier chip 262 may optionally be mounted.

In the embodiment of FIG. 2, the actuator body 210 includes a bore 214 therein, and an actuator pivot bearing 220 disposed at least partially within the bore 214. As will be described in more detail later in this specification, the actuator pivot bearing 220 may include an inner shaft that is fixed to the disk drive base (e.g. disk drive base 102 of FIG. 1), and a rotatable outer portion that may be attached to the actuator body 210. For example, in certain embodiments, the actuator pivot bearing 220 may include a rotatable outer sleeve that is press-fit into the bore 214 of the actuator body 210, and/or held in place within the bore 214 of the actuator body 210 by a conventional tolerance ring. Alternatively, the actuator pivot bearing 220 may be held within the bore 214 of the actuator body 210 by a conventional C-clip. Alternatively, the actuator pivot bearing 220 may instead have rotatable outer bearing races that are directly bonded to an inner surface of the bore 214 in the actuator body 210, for example, by a conventional adhesive.

Figure 3A:
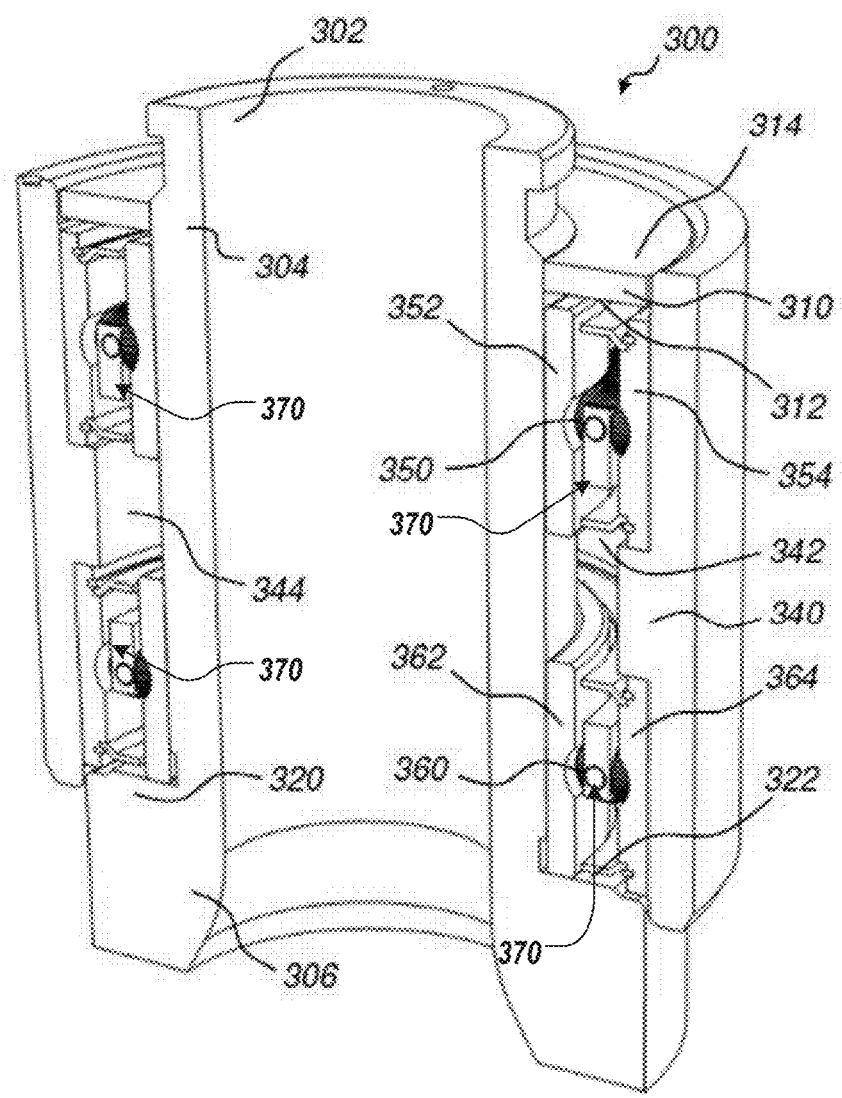
FIGS. 3A and 3B are a cut-away perspective views of an actuator pivot bearing capable of being assembled using one or more implementations of the present application.
Figure 3B:
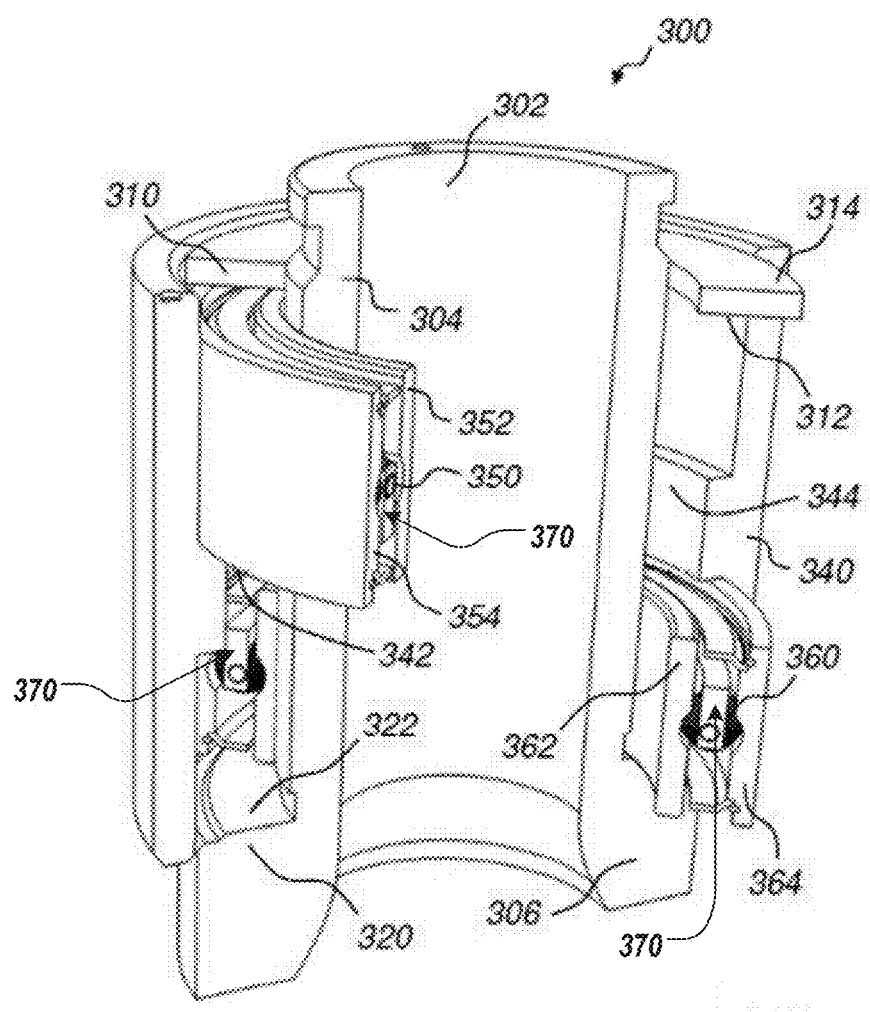

FIG. 3A is a cut-away perspective view of an actuator pivot bearing 300 capable of being assembled using one or more implementations of the present application. FIG. 3B also depicts the actuator pivot bearing 300, except with certain sub-components partially rotated (after the cut-away) for better visibility. Now referring to FIGS. 3A and 3B, the actuator pivot bearing 300 includes a fixed inner bearing shaft 302, and a bearing cap 310 attached to an upper portion 304 of the fixed inner bearing shaft 302. A lower portion 306 of the fixed inner bearing shaft 302 has a bottom flange 320. In this context and as shown in FIGS. 3A and 3B, a "flange" is a location of substantially increased diameter along the fixed inner bearing shaft 302.

In the embodiment of FIGS. 3A and 3B, the actuator pivot bearing 300 also includes an upper ball bearing 350, which includes an upper bearing inner race 352 and an upper bearing outer race 354. Also in the embodiment of FIGS. 3A and 3B, the actuator pivot bearing 300 includes a lower ball bearing 360, which has a lower bearing inner race 362 and a lower bearing outer race 364. In the embodiment of FIGS. 3A and 3B, a lubricant wets at least one surface of the upper ball bearing 350 and/or the lower ball bearing 360. For example, oil and/or grease may wet the surface of the upper bearing inner race 352, the upper bearing outer race 354, the lower bearing inner race 362, and/or the lower bearing outer race 364.

In the present context, a lubricant is said to "wet" a surface if adhesive forces between the lubricant and the surface (which encourage the lubricant to spread across the surface) exceed cohesive forces within the lubricant (which encourage the lubricant to ball up and therefore avoid increased contact with the surface at the lubricant's edges). However, if the cohesive forces are stronger than the adhesive forces, then the lubricant is said to not wet the surface.

Now referring again to FIGS. 3A and 3B, an upper surface 322 of the bottom flange 320 of the lower portion 306 of the fixed inner bearing shaft 302 is shown to face the upper ball bearing 350 and/or the lower ball bearing 360 and therefore faces the lubricant that wets one or more surfaces of the upper ball bearing 350 and/or the lower ball bearing 360. Also in the embodiment of FIGS. 3A and 3B, the bearing cap 310 has an underside 312 and an outer surface 314. The underside 312 of the bearing cap 310 is shown in FIGS. 3A and 3B to face the upper ball bearing 350 and/or the lower ball bearing 360 and therefore faces the lubricant that wets one or more surfaces of the upper ball bearing 350 and/or the lower ball bearing 360.

In the embodiment of FIGS. 3A and 3B, the actuator pivot bearing 300 optionally includes a rotatable outer bearing sleeve 340 fixed to the actuator body (e.g. actuator body 210 of FIG. 2) so that the actuator pivot bearing 300 may be considered as an actuator pivot bearing "cartridge." In the embodiment of FIGS. 3A and 3B, the actuator pivot bearing cartridge 300 has an internal cartridge space 342 that is bounded by an inner surface 344 of the rotatable outer bearing sleeve 340, the underside 312 of the bearing cap 310, and the upper surface 322 of the bottom flange 320. Note that the inner surface 344 of the rotatable outer bearing sleeve 340 is shown in FIGS. 3A and 3B to face the internal cartridge space 342. The upper ball bearing 350 and the lower ball bearing 360 are disposed within the internal cartridge space 342, and hence the lubricant is also disposed within the internal cartridge space 342. Additionally, a grease cage or grease retaining element 370 may be provided within the internal cartridge space 342 to hold the grease.

Figure 4:
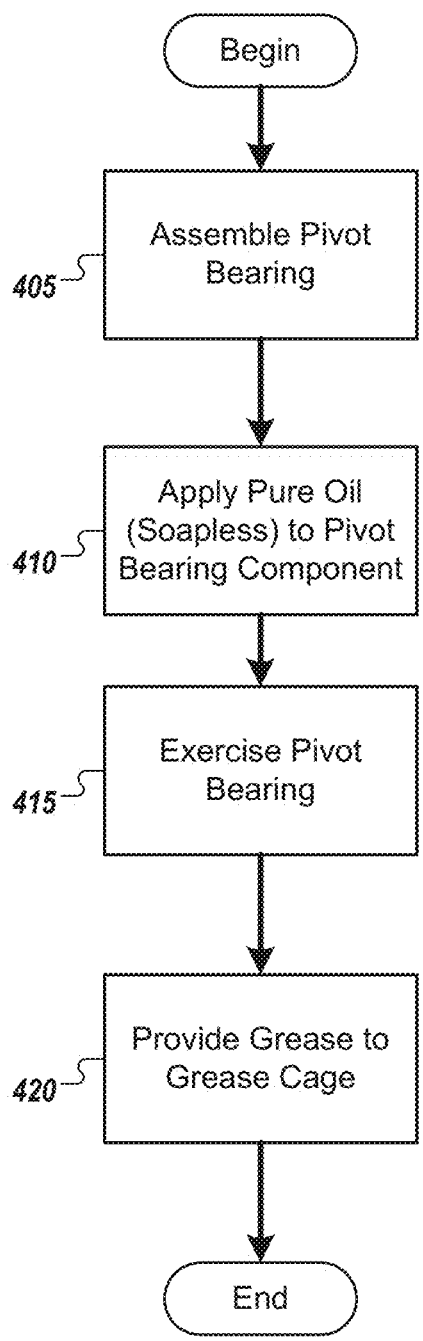
FIG. 4 is a flow chart illustrating an example embodiment of a method for lubricating an actuator pivot bearing according to an implementation of the present application.

FIG. 4 illustrates an example embodiment of a method for lubricating an actuator pivot bearing, such as the actuator pivot bearing 300 discussed above, according to an implementation of the present application. At 405 of FIG. 4, the actuator pivot bearing is dry assembled using conventional techniques. The assembly of the pivot bearing may be performed using automatic or computer controlled manufacturing techniques or may be performed using manual or human controlled manufacturing techniques. Once the actuator pivot bearing is dry assembled in 405, pure oil or soap-free oil (i.e. oil without any soap) is applied to one or more components of the pivot bearing in 410.

For example, soap-free or soap-less oil may be applied to the raceways and/or ball bearings 350, 360 of the pivot bearings 300. In some implementations, the application of pure oil or soap-free oil may be performed by submerging bearing components in the pure or soap-free oil. In some implementations, the application of pure or soap-free oil may be performed by providing the pure or soap-free oil to the components directly. In some implementations, the application of pure or soap-free oil is applied using one or more computer assisted applicators to provide precise control of application location and application volume. Additionally, in some implementations, the pure or soap-free oil is applied using a manual applicator.

Once the pure or soap-free oil has been applied to the bearing components such as the raceways and/or ball bearings 350, 360, the bearing is exercised or spun to distribute the pure or soap-free oil within the actuator pivot bearing 300 in 415. In some implementations the bearing may be exercised by being rotated in one direction through an entire range of motion. In some implementations the bearing may be rotated through more or less than an entire range of motion. In some implementations, the bearing may be exercised by rotating the bearing in one direction and in some implementations the bearing may be exercised by rotating the bearing back and forth in two or more directions in an oscillating manner. In some implementations, the bearing may be exercised using a computer-controlled or automated apparatus. In some implementations, the bearing may be manually exercised by a person with or without the use of an apparatus. Once the actuator pivot bearing has been exercised and the pure or soap-free oil distributed in 415, grease may be added to pockets in the bearing cage or grease retainer 370 in 420.

In some implementations, initially "wetting" bearing surfaces with pure or soap-free oil, and then exercising the bearing, may allow the oil in the grease to stay within the grease in the bearing cage or grease retainer 370 until it is needed which may increase retention of the grease in the desired pockets of the bearing cage or grease retainer until necessary. The above process of lubricating an actuator pivot bearing is merely provided as an example implementation and alternative implementations are discussed below.

Figure 5:
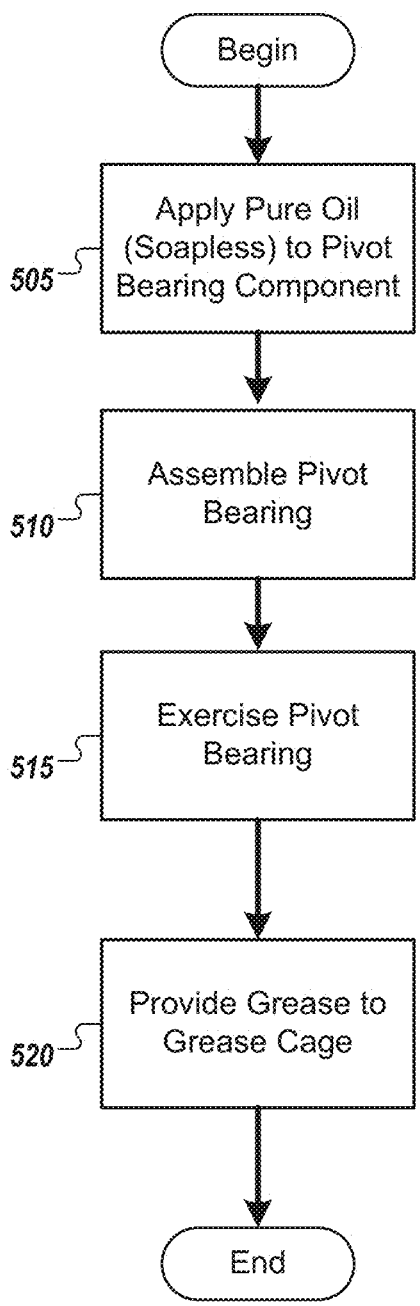
FIG. 5 is a flow chart illustrating another example embodiment of a method for lubricating an actuator pivot bearing according to an implementation of the present application.

FIG. 5 illustrates another example embodiment of a method for lubricating an actuator pivot bearing, such as the actuator pivot bearing 300 discussed above, according to an implementation of the present application. Referring to FIG. 5, the pure oil or soap-free oil (i.e. oil without any soap) is applied to one or more components of an unassembled pivot bearing 300 in 505.

For example, soap-free or soap-less oil may be applied to the raceways and/or ball bearings 350, 360 of the pivot bearings 300. In some implementations, the application of pure oil or soap-free oil may be performed by submerging bearing components in the pure or soap-free oil. In some implementations, the application of pure or soap-free oil may be performed by providing the pure or soap-free oil to the components directly. In some implementations, the application of pure or soap-free oil is applied using one or more computer assisted applicators to provide precise control of application location and application volume. Additionally, in some implementations, the pure or soap-free oil may be applied to the ball bearings manually.

Once the pure or soap-free oil has been applied to the bearing components such as the raceways and/or ball bearings 350, 360, the actuator pivot bearing is assembled using conventional techniques in 510. The assembly of the pivot bearing may be performed using automatic or computer controlled manufacturing techniques or may be performed using manual or human controlled manufacturing techniques.

Once the actuator pivot bearing is assembled in 510, the bearing is exercised or spun to distribute the pure or soap-free oil within the actuator pivot bearing 300 in 515 and grease may be added to pockets in the bearing cage or grease retainer 370 in 520. 515 and 520 may be performed in substantially the same fashion as described above with respect to 415 and 420.

Figure 6:
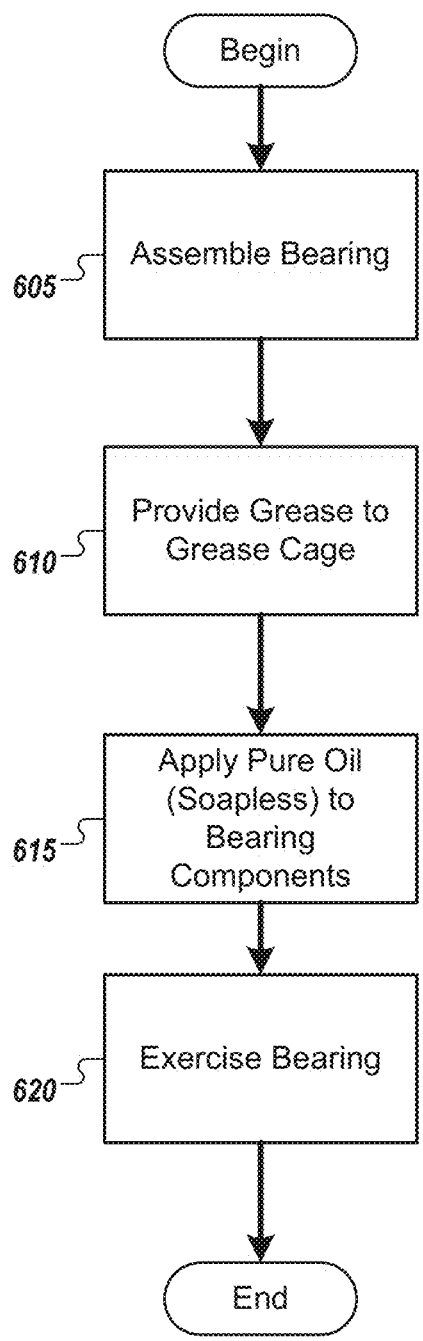
FIG. 6 is a flow chart illustrating another example embodiment of a method for lubricating an actuator pivot bearing according to an implementation of the present application.

FIG. 6 illustrates an example embodiment of a method for lubricating an actuator pivot bearing, such as the actuator pivot bearing 300 discussed above, according to an implementation of the present application. Referring to FIG. 6, the actuator pivot bearing is dry assembled using conventional techniques in 605. The assembly of the pivot bearing may be performed using automatic or computer controlled manufacturing techniques or may be performed using manual or human controlled manufacturing techniques. Once the actuator pivot bearing 300 is dry assembled in 605, grease may be added to pockets in the bearing cage or grease retainer 370 in 610.

Once the grease has been added to the pockets in the bearing cage or grease retainer 370 in 610, pure oil or soap-free oil (i.e. oil without any soap) is applied to one or more components of the pivot bearing in 615. For example, soap-free or soap-less oil may be applied to the raceways and/or ball bearings 350, 360 of the pivot bearings 300. In some implementations, the application of pure oil or soap-free oil may be performed by submerging bearing components in the pure or soap-free oil. In some implementations, the application of pure or soap-free oil may be performed by providing the pure or soap-free oil to the components directly. In some implementations, the application of pure or soap-free oil is applied using one or more computer assisted applicators to provide precise control of application location and application volume. Additionally, in some implementations, the pure or soap-free oil is applied using a manual applicator.

Once the pure or soap-free oil has been applied to the bearing components, such as the raceways and/or ball bearings 350, 360, the bearing is exercised or spun to distribute the pure or soap-free oil within the actuator pivot bearing 300 in 620. In some implementations the bearing may be exercised by being rotated in one direction through an entire range of motion. In some implementations, the bearing may be rotated through more or less than an entire range of motion. In some implementations, the bearing may be exercised by rotating the bearing in one direction and in some implementations the bearing may be exercised by rotating the bearing back and forth in two or more directions in an oscillating manner. In some implementations, the bearing may be exercised using a computer-controlled or automated apparatus. In some implementations, the bearing may be manually exercised by a person with or without the use of an apparatus.

Again, initially "wetting" bearing surfaces with pure or soap-free oil, and then exercising the bearing, may allow the oil in the grease to stay within the grease in the bearing cage or grease retainer 370 until it is needed which may increase retention of the grease in desired pockets until necessary. The above process of lubricating an actuator pivot bearing is merely provided as an example implementation and alternative implementations are discussed below.

Figure 7:
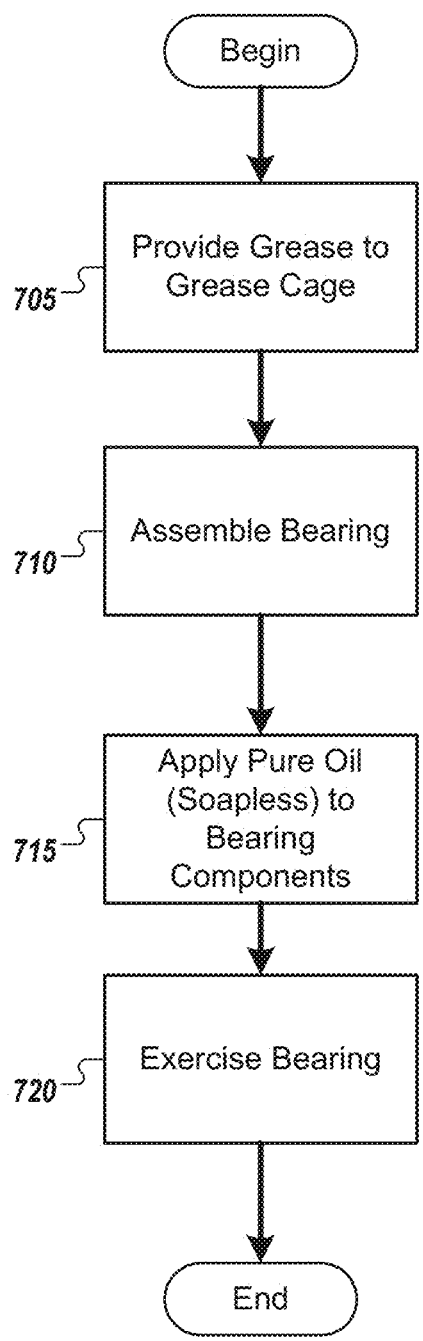
FIG. 7 is a flow chart illustrating another example embodiment of a method for lubricating an actuator pivot bearing according to an implementation of the present application.

FIG. 7 illustrates another example embodiment of a method for lubricating an actuator pivot bearing, such as the actuator pivot bearing 300 discussed above, according to an implementation of the present application. Referring to FIG. 7, grease may be added to pockets in the bearing cage or grease retainer 370 of an unassembled bearing 300 in 705.

Once the grease is added to the bearing cage or grease retainer 370 of the unassembled bearing 300 in 705, the actuator pivot bearing is assembled using conventional techniques in 710. The assembly of the pivot bearing may be performed using automatic or computer controlled manufacturing techniques or may be performed using manual or human controlled manufacturing techniques Once the actuator pivot bearing is assembled in 710, pure oil or soap-free oil (i.e. oil without any soap) is applied to one or more components of the pivot bearing in 715. For example, soap-free or soap-less oil may be applied to the raceways and/or ball bearings 350, 360 of the pivot bearings 300. In some implementations, the application of pure oil or soap-free oil may be performed by submerging bearing components in the pure or soap-free oil. In some implementations, the application of pure or soap-free oil may be performed by providing the pure or soap-free oil to the components directly. In some implementations, the application of pure or soap-free oil is applied using one or more computer assisted applicators to provide precise control of application location and application volume. Additionally, in some implementations, the pure or soap-free oil is applied using a manual applicator.

Once the pure or soap-free oil has been applied to the bearing components, such as the raceways and/or ball bearings 350, 360, the bearing is exercised or spun to distribute the pure or soap-free oil within the actuator pivot bearing 300 in 720. 720 may be performed in substantially the same fashion as described above with respect to 620.

While certain embodiments have been described, these embodiments have been presented by way of example only, and are not intended to limit the scope of the protection. Indeed, the novel methods and apparatuses described herein may be embodied in a variety of other forms. Furthermore, various omissions, substitutions and changes in the form of the methods and systems described herein may be made without departing from the spirit of the protection.

What is claimed is:

1. A method of lubricating a bearing for an actuator pivot of a storage device, the method comprising:
   receiving an assembled bearing for an actuator pivot of a storage device;
   applying a first lubricant comprising a volume of soap-free oil onto a bearing component of the assembled bearing, the bearing component comprising one or more of a raceway and a ball bearing; and
   dispensing a second lubricant comprising a predetermined volume of soap-containing grease into a bearing cage.

2. The method of claim 1, further comprising exercising the bearing after applying the volume of soap-free oil by rotating the bearing.

3. The method of claim 2, wherein the exercising the bearing comprises rotating the bearing through an entire range of motion of the bearing.

4. The method of claim 1, wherein the volume of soap-free oil is dispensed using a precisely controlled oil-dispensing apparatus.

5. The method of claim 4, wherein the oil-dispensing apparatus is a computer-controlled dispensing apparatus.

6. The method of claim 1, wherein the applying the first lubricant comprises applying soap-free oil to at least one of a raceway of the bearing and a ball of the bearing.

7. The method of claim 1, wherein the applying the first lubricant comprises submerging the bearing component into the soap-free oil.

8. A method of lubricating a bearing for an actuator pivot of a storage device, the method comprising:
   applying a first lubricant comprising a volume of soap-free oil onto a bearing component to be placed within the bearing of the actuator pivot, the bearing component comprising one or more of a raceway and a ball bearing;
   inserting the bearing component into the bearing of the actuator pivot to assemble the bearing; and
   dispensing a second lubricant comprising a predetermined volume of soap-containing grease into a bearing cage.

9. The method of claim 8, further comprising exercising the bearing after inserting the bearing component by rotating the bearing.

10. The method of claim 9, wherein the exercising the bearing comprises rotating the bearing through an entire range of motion of the bearing.

11. The method of claim 8, wherein the volume of soap-free oil is dispensed using a precisely controlled oil-dispensing apparatus.

12. The method of claim 11, wherein the oil-dispensing apparatus is a computer-controlled dispensing apparatus.

13. The method of claim 8, wherein the applying the first lubricant onto a bearing component comprises applying soap-free oil to at least one of a raceway of the bearing and a ball of the bearing.

14. The method of claim 8, wherein the applying the first lubricant comprises submerging the bearing component into the soap-free oil.

15. A method of lubricating a bearing for an actuator pivot of a storage device, the method comprising:
   receiving an assembled bearing for an actuator pivot of a storage device;
   dispensing a second lubricant comprising a predetermined volume of soap-containing grease into a bearing cage of the assembled bearing for an actuator pivot of a storage device;
   and
   applying a first lubricant comprising a volume of soap-free oil onto a bearing component of the assembled bearing, the bearing component comprising one or more of a raceway and a ball bearing.

16. The method of claim 15, further comprising exercising the bearing after applying the volume of soap-free oil by rotating the bearing.

17. The method of claim 16, wherein the exercising the bearing comprises rotating the bearing through an entire range of motion of the bearing.

18. The method of claim 15, wherein the volume of soap-free oil is dispensed using a precisely controlled oil-dispensing apparatus.

19. The method of claim 18, wherein the oil-dispensing apparatus is a computer-controlled dispensing apparatus.

20. The method of claim 15, wherein the applying the first lubricant onto a bearing component comprises applying soap-free oil to at least one of a raceway of the bearing and a ball of the bearing.

21. The method of claim 15, wherein the applying first lubricant comprises submerging the bearing component into the soap-free oil.

22. A method of lubricating a bearing for an actuator pivot of a storage device, the method comprising:
  dispensing a second lubricant comprising a predetermined volume of soap-containing grease into a bearing cage of the assembled bearing for an actuator pivot of a storage device;
  applying a first lubricant comprising a volume of soap-free oil onto a bearing component to be placed within the bearing of the actuator pivot, the bearing component comprising one or more of a raceway and a ball bearing; and
  inserting the bearing component into the bearing of the actuator pivot to assemble the bearing.

23. The method of claim 22, further comprising exercising the bearing after inserting the bearing component by rotating the bearing.

24. The method of claim 23, wherein the exercising the bearing comprises rotating the bearing through an entire range of motion of the bearing.

25. The method of claim 22, wherein the volume of soap-free oil is dispensed using a precisely controlled oil-dispensing apparatus.

26. The method of claim 25, wherein the oil-dispensing apparatus is a computer-controlled dispensing apparatus.

27. The method of claim 22, wherein the applying the first lubricant onto a bearing component comprises applying soap-free oil to at least one of a raceway of the bearing and a ball of the bearing.

28. The method of claim 22, wherein the applying the first lubricant comprises submerging the bearing component into the soap-free oil.

\* \* \* \* \*